United States Patent [19]
Morris

[11] Patent Number: 5,523,875
[45] Date of Patent: Jun. 4, 1996

[54] AUTOMATIC GAIN CONTROL CIRCUIT

[75] Inventor: Rodney A. Morris, Lawrenceville, Ga.

[73] Assignee: Scientific-Atlanta, Inc., Norcross, Ga.

[21] Appl. No.: 428,001

[22] Filed: Apr. 24, 1995

[51] Int. Cl.[6] .................................................. A04B 10/00
[52] U.S. Cl. .......................................... 359/194; 359/161
[58] Field of Search ................................. 359/194, 153, 359/161, 173; 455/241.1, 249.1, 246.1, 234.1

[56] References Cited

U.S. PATENT DOCUMENTS 5,267,071  11/1993  Little et al. ............................. 359/194

5,457,811  10/1995  Lemson ................................... 359/194

*Primary Examiner*—Leo Boudreau
*Assistant Examiner*—Rafael Barares
*Attorney, Agent, or Firm*—John V. Pezdek

[57] ABSTRACT

An automatic gain control circuit for use in a multichannel RF system using fiber optic links. The circuit samples the power levels from a number of attenuated RF signals simultaneously and adjusts the gain in all of the channels by the amount required to keep the highest power channel below a predetermined power level determined by the power capacity of the fiber optic link while maintaining the signal strength relationship between the attenuated signals as was existing between the RF input signals.

5 Claims, 2 Drawing Sheets

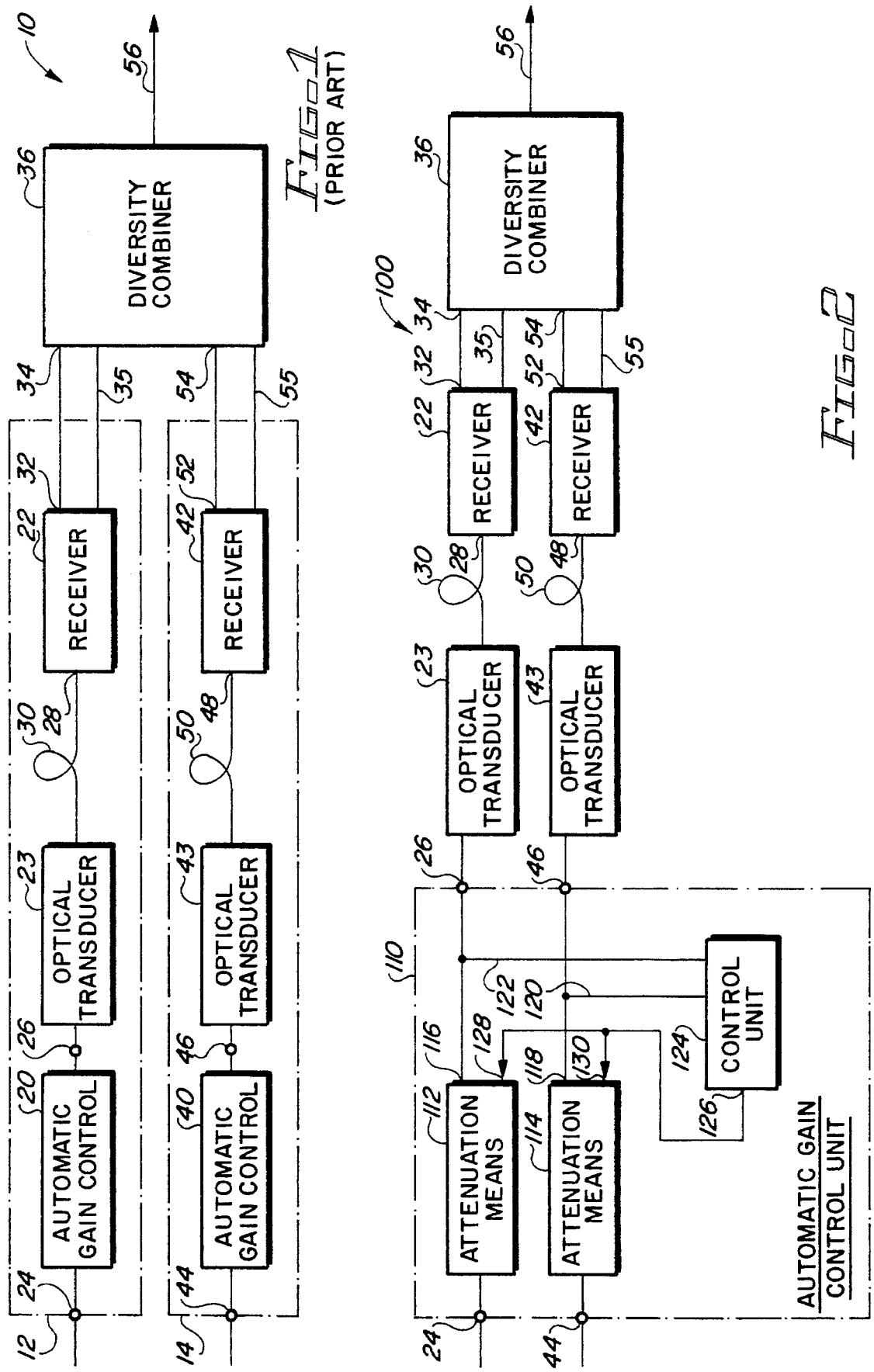

AUTOMATIC GAIN CONTROL CIRCUIT

BACKGROUND OF THE INVENTION

1. Technical Field

The field of this invention is communication and telemetry systems, such as satellite communications systems, and, in particular, to automatic gain control circuits used with fiber optic links employed in such systems.

2. Description of the Prior Art

In communications and telemetry systems frequency and/or polarization diversity are often used to improve the reception of radio frequency (RF) signals from a mobile source (such as aircraft, vessel or automobile). This technique requires that the receiving equipment compare the relative strengths of the different received signals and combine them in a manner that results in the greatest signal-to-noise ratio.

The emergence of laser fiber-optic technology has enabled systems designers to locate the receiving equipment that does the comparing and combining great distances from the receiving antennas. Because fiber-optic links are noisy, it is very desirable to transmit high strength or high power signals. The current state-of-the-art in fiber optic equipment, however, limits the range of signal strength that can be transmitted over the fiber-optic link and forces the system designer to place variable gain elements in front of the fiber-optic transmitter to limit the transmitted signal strength. This is necessary to simultaneously keep from overdriving or burning out the fiber-optic link when the received signal strength is high and to preserve system noise temperature when the signal is weak.

With current designs, each signal channel utilizes independent automatic gain control circuits to boost the received signal strength. This gain control on the channels disturbs the relative levels of each channel at the input to the comparing and combining equipment resulting in incorrect decisions occurring at such equipment.

FIG. 1 illustrates a typical prior art two channel automatic gain control (AGC) system, generally designated 10. Left and right channels 12 and 14 are designated by the dashed lines in FIG. 1. Channel 12 consists of an automatic gain control unit 20 and a receiver 22. The input 24 to AGC unit 20 receives the left channel signal, normally an RF signal, from a receiving antenna amplifier (not shown). The output 26 of automatic gain control unit 20 is connected to the input 28 of receiver 22 via optical transducer 23 and fiber optic link 30. The output 32 of receiver 22 is connected to the input 34 of a diversity combiner 36. Right channel 14 consists of AGC unit 40 and receiver 42. The input 44 of AGC unit 40 receives the right channel signal from the antenna amplifier. The output 46 of AGC unit 40 is connected to the input 48 of receiver 42 via optical transducer 43 and optical link 50. The output 52 of receiver 42 is connected to the input 54 of diversity combiner 36. In addition, the receivers 22 and 42 also measure the signal strength of the respective received signals and transmit this data to diversity combiner unit 36 via leads 35 and 55, respectively. Transducers 23 and 43 convert the attenuated RF output signals on outputs 26 and 46 to optical signals.

On a two channel system 10 assume that the incoming or received signals on the left channel 12 and right channel 14 have power levels of +12 dBm and −32 dBm, respectively, or a signal power differential of 44 dB in signal strength. Because the right channel signal is weaker, its signal-to-noise ratio is lower than that of the left channel signal. However, using the independent AGC circuits of FIG. 1, the signals on outputs 26 and 46 of AGC units 20 and 40, respectively would each be attenuated as is known in the art (in this case amplified) to a predetermined signal strength levels of +15 dBm, for example, with a resulting differential of zero dB. The signals are each then transmitted over their respective fiber-optic links 30 and 50 to their respective receivers 22 and 42. In the diversity combiner 36, the combiner uses a weighting algorithm, as is known in the art, which combines a portion of each channel signal in proportion to its signal strength to achieve an optimal signal. To have the best signal (i.e., one with the greatest signal to noise ratio), the diversity combiner should use a greater proportion of the stronger of the two signals as originally received (i.e., the signal on left channel 12). However, because the two signals received at inputs 34 and 54 from receivers 22 and 42 have been attenuated and are now equal, the diversity combiner weighs each signal equally with the resulting combined signal at the output 56 having an increased noise content.

It would be beneficial to have an AGC circuit that maintains the relative difference in the power levels between the signals to be compared, while keeping the fiber-optic links from being overdriven.

SUMMARY OF THE INVENTION

The circuit of the present invention simultaneously samples the power levels of signals in a multi-channel system and adjusts the gain in all of the channels by the amount required to keep the strongest channel below a predetermined specified level while maintaining the signal strength relationship among the multiple signals.

BRIEF DESCRIPTION OF THE DRAWINGS

These and other objects, features and aspects of the invention will be more clearly understood if the following detailed description is read in conjunction with the drawings in which:

FIG. 1 is a schematic and diagrammatic illustration of a prior art automatic gain control system;

FIG. 2 is a schematic and diagrammatic illustration of a system embodying the present invention; and, FIG. 3 is a schematic representation of an automatic gain control circuit of the present invention as used in FIG. 2.

DETAILED DESCRIPTION OF THE INVENTION

Figure 3:
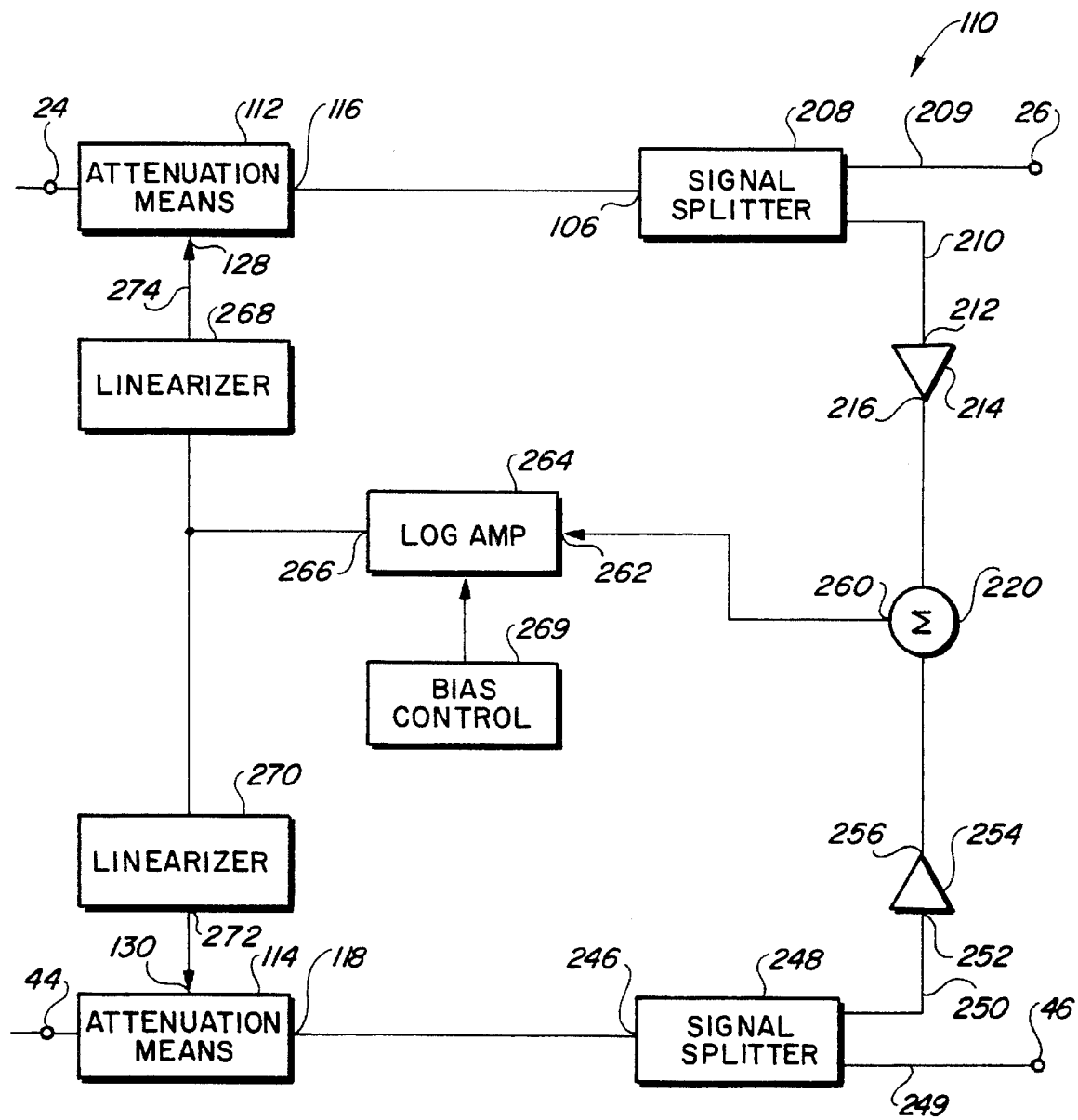

In FIG. 2, a schematic illustration of an embodiment of the invention for a two channel version of a multiple channel RF system is shown. Components having the same function as those given in FIG. 1 will carry the same or similar reference numerals. The system for two channels, generally designated 100, is comprised of an automatic gain control (AGC) circuit 110 within the dotted lines having inputs 24 and 44 and outputs 26 and 46 for the left and right channels, respectively. The RF input signals that are received on these channels having varying power levels. The outputs 26 and 46 are connected to inputs 28 and 48 of receivers 22 and 42, respectively via optical transducers 23 and 43 and fiber optic links 30 and 50, respectively. The outputs 32 and 42 of the two receivers are connected to inputs 34 and 54 of the diversity combiner unit 36. In addition, the receivers 22 and 42 also measure the signal strength of the received signals and transmit this data to diversity combiner unit 36 via leads 35 and 55, respectively. The receivers convert the received optical signals to electrical signals that are transmitted to the inputs of the diversity combiner unit 36.

The weighted combination signal on output 56 is the weighted combination, as determined by the diversity combiner unit 36, of the original RF inputs signals that were received from the antenna receiver. For example, if the left channel signal power level was twice that of the right channel, the weighted combination signal would be based to a greater extent on the left channel signal than the right. The exact proportioning of the weighting signals is determined by the weighting algorithm used in the diversity combiner unit 36. A number of weighting algorithms can be used as is known in the art. The weighted combination signal is sent to other equipment for further processing to extract the data which is contained in the signal. In practice the attenuation means and optical transducers are located at a first site which is remote from a second site at which the receivers and diversity combiner unit are located. The two sites are interconnected with the fiber optic links used for each channel.

Inputs 24 and 44 are connected to attenuation means 112 and 114, respectively. The outputs 116 and 118 of attenuation means 112 and 114 are connected to outputs 26 and 46 and to inputs 120 and 122 of the control unit 124, respectively. The control unit 124 comprises a signal sampling and conversion means for sampling the left and right channel signals and converting the sampled signals to a DC voltage signals, and a summing means for summing the converted DC voltage signals, logarithmic amplifying means for logarithmically amplifying the summed DC voltage signals, a biasing control for the logarithmic amplifier, and linearizing means for linearizing the logarithmically amplified summed DC voltage signals and which is more fully described hereinafter in reference to FIG. 3. This linearized signal is the gain limit signal. The output 126 of control unit 124, which provided the gain limit signal is connected to the gain limit inputs 128 and 130 on attenuation means 112 and 114, respectively.

Preferably, attenuation means 112 and 114 for the left and right channel signals closely track one another over the dynamic range of the RF signals to be attenuated. While the closeness in tracking is a function of the overall system in which the AGC circuit 110 is used; for satellite or mobile vehicle tracking systems the attenuation means preferably track within plus or minus two to three dB over throughout the dynamic range of the system. For satellite or mobile tracking systems, the input signals are in the RF range and attenuation means 112 and 114 are preferably of the type known as pin diode attenuators. Such a pin diode attenuator is Model 4080 manufactured by American Microwave, Corporation of 7311G Grove Road, Frederick, Md. Other means for attenuating the left and right channel signals include using variable gain amplifiers, motorized attenuators and analog multipliers as are known in the art. Preferably, the diversity combiner is a Model 934-2 made by Scientific-Atlanta, Inc. of Norcross, Ga.

In control unit 124 the power levels of the RF signals on outputs 116 and 118 are continually sampled by the sampling and conversion means and converted to DC voltage signals, which are linearly proportional to the left and right channel signal strength levels, respectively. The DC voltage signals are then summed together in a summing means. The summed signal represents a composite level of the signals on outputs 116 and 118. The composite level signal is filtered, amplified, converted to volts/dB ratio signal via the logarithmic amplifying means which is subject to the bias control and then linearized in a linearization means. This linearized signal or gain limit signal is provided on output 126 to the gain limit inputs 128 and 130 on attenuation means 112 and 114 for the two channels, so that both attenuation means provide the same amount of attenuation for a given linearized output signal from the control unit 124. The bias control limits the maximum output signal of the logarithmic amplifying means that is then linearized and output to the gain limit inputs 128 and 130 as the gain limit signal. This biasing ensures that the attenuation means 112 and 114 cannot exceed a predetermined maximum attenuation level for the fiber optic links 30 and 50 and prevents the fiber optic links from being overdriven by the attenuation means.

The attenuation means 112 and 114 must also have sufficient gain to boost the lowest expected input channel signal level to the predetermined maximum attenuation level. Use of the AGC circuit 110 allows the channel signals to be attenuated while maintaining the signal strength differential between the channel signals. When these signals are attenuated in the manner described and transmitted to diversity combiner 36 via optical transducers 23 and 43, fiber optic links 30 and 50 and receivers 22 and 42, respectively, diversity combiner 36 will more accurately perform its weighting function resulting in an output signal having a lower noise content on output 56.

An embodiment of the AGC circuit 110 is shown in FIG. 3. The attenuated RF signal on output 116 of attenuation means 112 is directed to the input 206 of signal splitter or divider means 208, as is known in the art, where the left channel signal is sampled by splitting it into two portions, each of which is output. One output 209 of the signal divider means 208 is connected to output 26. Signal divider means 208 provides a sampled signal output 210 which is proportional to the magnitude of the attenuated RF signal. This sampled signal is directed to the input 212 of detector amplifier 214 and is further processed and eventually fed back to attenuation means 112. Examples of signal divider means that may be used include a directional coupler, a resistive power divider, a Wilkinson splitter or a hybrid divider. The output 216 of the amplifier 214 is directed to a summing amplifier 220. The output 118 of attenuator 114 is also directed to the input 246 of signal divider means 248 having a similar function to that of signal divider means 208. One output 249 of the signal divider means 248 is connected to output 46. The other output 250 of the signal divider means 248 is directed to the input 252 of detector amplifier 254 whose output 256 is directed to summing amplifier 220. The output 260 of summing amplifier 220 is directed to the input 262 of the logarithmic amplifier 264. The output 266 of the logarithmic amplifier is directed to the inputs of linearizers 268 and 270. The output signal of the logarithmic amplifier 264 is limited by the bias control 269. The output 272 of linearizer 270 is connected to the gain limit input 130 of attenuator 114. The output 274 of linearizer 268 is directed to the gain limit input 128 of attenuator 112.

The sampled signals on outputs 210 and 250 that are directed to the detector amplifiers 214 and 254, respectively, are proportional of the power level of the left and right channel signals. The signals on inputs 212 and 252 of the detector amplifiers 214 and 254, respectively, are converted by these amplifiers into DC voltage signals proportional to the power level of the respective signals on the respective outputs 216 and 256. The signal on output 260 of the summing amplifier 220 represents the sum of the signals output from the amplifiers 214 and 254. The signal on output 260, after passing through logarithmic amplifier 264, is converted into a DC voltage signal in units of volts/dB and is proportional to the square root of the power level of the added signals from outputs 216 and 256. As is known in the art, the bias control limits the signal on output 266 to a predetermined maximum level. This maximum level is determined by the power capacity of the fiber optic links 30 and 50 and receivers 22 and 42. The limit is set so that the attenuation means does not overdrive either the fiber optic links or their respective receivers. The signal on output 266 is then linearized in linearizers means 268 and 270. Linearization is accomplished by means of an operational amplifier utilizing in the amplifier feedback loop resistor diode combinations having multiple break points. This results in piecewise linearization of the signal input to gain limit inputs on the attenuation means for each channel. Other linearization means may also be used.

The circuit as described ensures that the end-to-end gain in all the channels is equal and that the strongest signal will be held to a predetermined maximum attenuation level that will not overdrive the fiber optic link that is interconnecting the two remotely located sites at which the equipment is located. Use of linearization allows each channel to provide equal net attenuation (or gain) over the dynamic range of the system allowing the decision making process of the diversity combiner unit 36 to be more accurate and achieve a signal having a lower noise component than achieved by prior art circuits.

Preferably each channel has a linearization means, however, a single linearizing circuit may be used and its output then directed to the gain level inputs 128 and 130 of the attenuation means. The linearization means may be comprised of separate components as shown or may be integrated into the attenuation means 112 and 114. An example of such an integrated attenuation means is the linearized pin diode attenuator Model AGT-2000-60-D also manufactured by American Microwave Corporation.

It should be recognized that while the above circuit illustrates only two channels the circuit may be expanded to a multichannel application by use of additional signal channels. Corresponding signal inputs are provided to the summing amplifier from the attenuation means of each added channel via that channel's signal divider means and detection amplifiers and corresponding linearization means and gain limit output signals are provided to each additional channel.

Variations and modifications to the describe methods and apparatus, within the scope of the invention will suggest themselves to those skilled in the art, and should be taken as illustrative. The invention is intended to encompass all such modifications which are within the spirit and scope of the claims.

I claim:

1. An automatic gain control circuit in a multiple signal channel RF system having at least two RF input channels, each caroling a RF input signal of varying strength, and a corresponding number of RF output channels, each RF output channel providing attenuated RF output signal to a corresponding fiber optic link via an optical transducer, comprising:

attenuation means for each RF input channel for attenuating the RF input signals and producing attenuated RF outputs signals, each attenuation means having an input connected to receive its corresponding one of said RF input signals, a gain limit signal input for receiving a gain limit signal, and an output for providing an attenuated RF output signal to its corresponding one of said RF signal channel outputs with each attenuation means being responsive to the gain limit signal for controlling the power level of the attenuated RF output signal on the output;

sampling and conversion means for each attenuated RF output signal for sampling of the attenuated RF output signal and converting the sampled signal into a converted signal proportional to the power level of the attenuated RF output signal, each sampling and conversion means having an input connected to the output of the corresponding attenuation means and an output for the converted signal;

summing means for summing the converted signals from each sampling and conversion means and producing a summed signal, the summing means having an inputs corresponding to the outputs of the sampling and conversion means for receiving the corresponding converted output signals and an output for the summed signal;

logarithmic amplifying means for logarithmically amplifying the summed signal and producing an amplified output signal, the logarithmic amplifying means having an input connected to the output of the summing means and an output for the amplified output signal;

bias control means connected to the logarithmic amplifying means for limiting the level of the amplified output signal to a predetermined maximum level;

linearization means for linearizing the amplified output signal of the logarithmic amplifying means and producing the gain limit signal, linearization means provided for each attenuation means, the linearization means having an input for receiving the amplified output signal of the logarithmic amplifying means and an output for providing the gain limit signal connected to the gain limit signal input of each attenuation means whereby the automatic gain control circuit simultaneously maintains the signal strength differential between the attenuated RF output signals as was existing between the RF input signals while attenuating each of the RF input signals such that the highest power attenuated RF output signal does not exceed a maximum predetermined level.

2. The apparatus of claim 1 wherein the number of linearization means correspond to the number of attenuation means, each linearization means having an input for receiving the amplified signal and an output connected to the gain limit input of its respective attenuation means for providing the gain limit signal.

3. The apparatus of claim 2 wherein the linearization means comprises an operational amplifier having a feedback loop having resistor diode combinations for the piecewise linearization of the amplified signal.

4. The apparatus of claim 1 wherein each sampling and conversion means for the attenuated RF signal further comprises:

a signal divider for dividing the attenuated RF output signal into at least a first portion and a second portion, each signal divider having an input connected to the output of the corresponding attenuation means and at least two outputs with one of the outputs being the RF output channel providing the attenuated RF output signal on which the first portion is transmitted and the other output providing a sampled signal formed by said second portion; and a detection amplifier for converting the sample signal into the converted signal, each detection amplifier having an input connected to the output of the signal divider that provides the sampled signal and an output for the converted signal connected to its corresponding input on the summing means.

5. A multiple input, multiple output RF signal channel system having signal processing elements located at at least two remotely located but interconnected sites, comprising:

fiber optic links for transmitting optical signals and interconnecting the two sites, the number of fiber optic links corresponding in number to the number of output RF signal channels;

automatic gain control means, located at a first site, having a number RF input channels corresponding to the number of RF input signals provided in the RF system for receiving the RF input signals and a corresponding number of RF output channels for providing a corresponding number attenuated RF output signals, the automatic gain control means simultaneously maintaining the signal strength differential between the attenuated RF output signals as was existing between the RF input signals while attenuating each of the RF input signals such that the highest power attenuated RF output signal does not exceed a maximum predetermined level based on the power capacity of the fiber optic links;

optical transducers corresponding to the number of RF output channels and located at the first site, one optical transducer connected to a corresponding one of said RF output channels, each transducer converting its corresponding attenuated RF signal input thereto into an optical output signal whereby the highest power attenuated RF signals when converted does not exceed a maximum predetermined level for said fiber optic link, optical receivers corresponding in number to the number of RF output channels and located at a second site remote from said first site, each receiver having an input for receiving one of said optical output signals and producing on an output thereof an electrical signal representative of the optical signal received, with the optical receivers and optical transducers being interconnected by a corresponding one of said fiber optic links; and, a diversity combiner unit located at the second site having inputs corresponding in number to the number of RF output channels for receiving the electrical signals from the optical receivers.

* * * * *